Feb. 21, 1950      C. W. WELKER      2,498,191
BARBED WIRE REEL TRUCK
Filed May 28, 1947      2 Sheets-Sheet 1
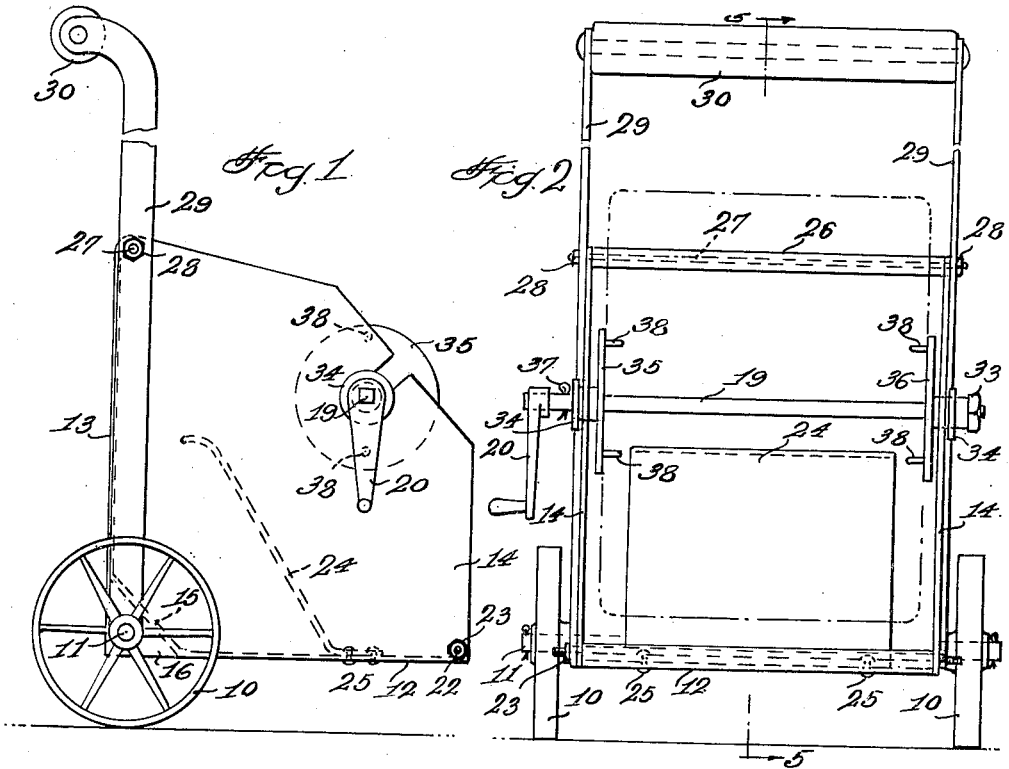
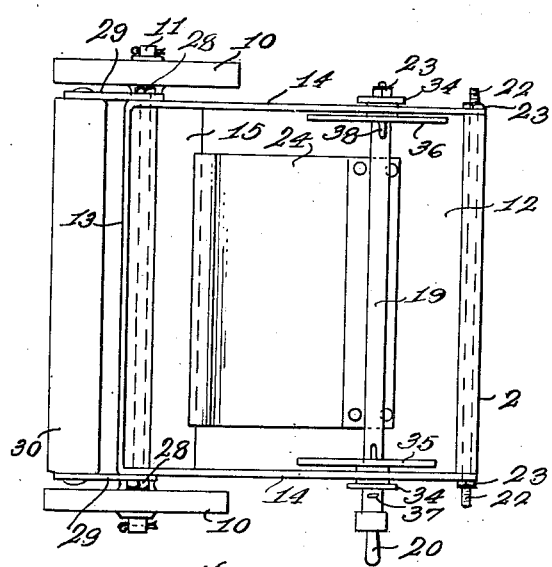
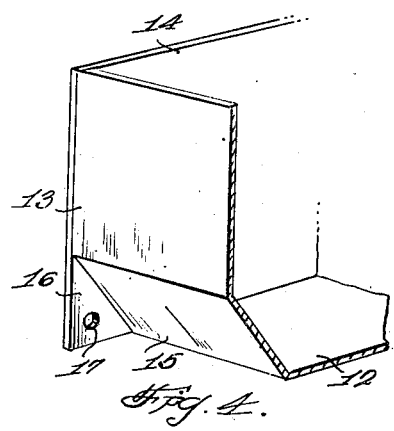
Inventor
Charles W. Welker
By Randolph & Beavers
Attorneys Feb. 21, 1950     C. W. WELKER     2,498,191
BARBED WIRE REEL TRUCK
Filed May 28, 1947     2 Sheets-Sheet 2
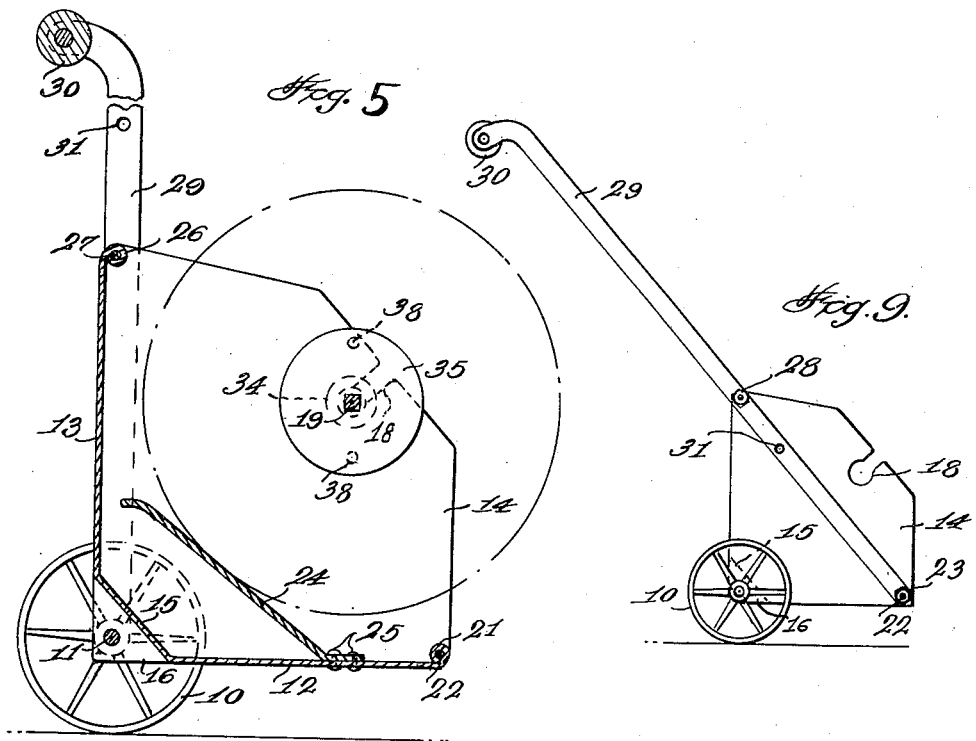
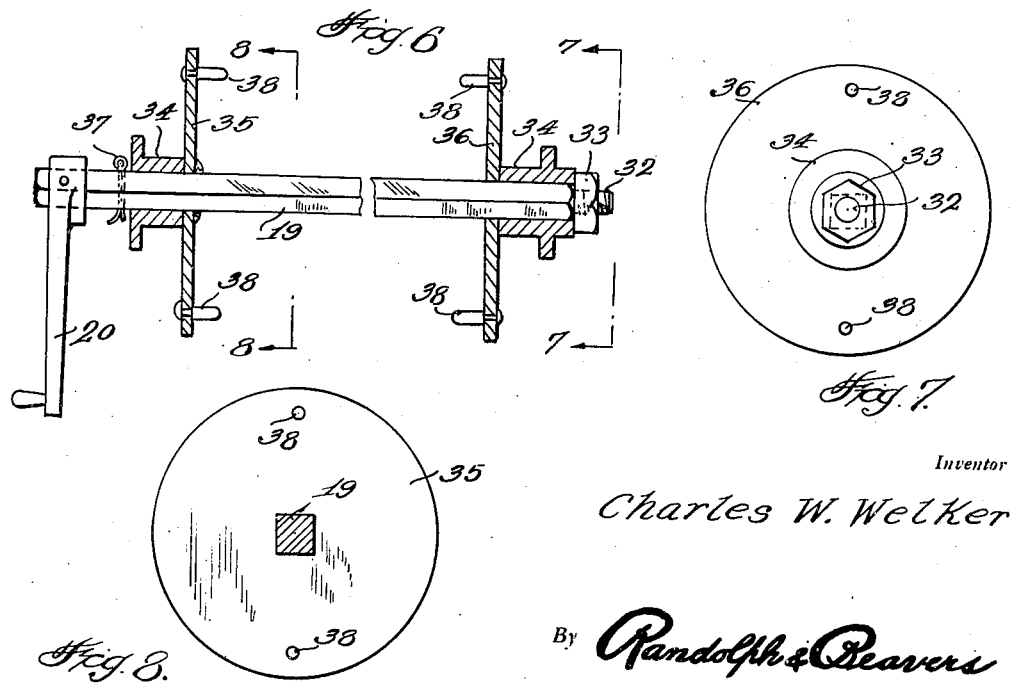
Inventor
Charles W. Welker
By Randolph & Beavers
Attorneys Patented Feb. 21, 1950

2,498,191

UNITED STATES PATENT OFFICE 2,498,191

BARBED WIRE REEL TRUCK

Charles W. Welker, Chicago, Ill.

Application May 28, 1947, Serial No. 750,956

2 Claims. (Cl. 214—65)

The present invention relates to a barbed wire reel truck and it consists in the combinations, constructions and arrangements of parts herein described and claimed.

Generally, the invention comprises a truck having means for removably mounting a reel of wire therein and incorporating means for braking the movement of the reel when the same is being unwound. Provision is made for the changing of the position of the handle bars associated with the truck so that the same may be used as an ordinary hand truck when the reel is dismounted therefrom. An operating handle is also provided for the rotation of the reel whereby wire may be rewound upon the reel.

It is an object of the invention to provide a novel, inexpensive, simple and efficient reel supporting truck.

It is a further object of the invention to provide a reel supporting truck which may be converted into a hand truck.

Another object of the invention is the provision of novel means for removably mounting a reel in a device of the character set forth.

Another object of the invention is the provision of novel braking means in a device of the character above set forth.

Other and further objects of the invention will become apparent from a reading of the following specification taken in conjunction with the drawings, in which:

Figure 1 is a side elevational view of an embodiment of the invention,

Figure 2 is a front elevational view of the device shown in Figure 1,

Figure 3 is a plan view of the device shown in Figures 1 and 2,

Figure 4 is a fragmentary perspective view disclosing certain details of the invention, Figure 5 is a sectional view taken along line 5—5 of Figure 2, Figure 6 is a view, partly in section, of an element of the invention, Figure 7 is an end view of Figure 6 taken in the direction of the arrows along line 7—7 thereof, Figure 8 is a sectional view taken along line 8—8 of Figure 6, and Figure 9 is a reduced side elevational view of the invention with the handle thereof moved to another position.

Referring more particularly to the drawings, there is shown therein a truck having a pair of wheels 10 mounted upon an axle 11 affixed in the lower end of the rear portion of a truck body having a bottom 12, a back portion 13 and a pair of side members 14.

The back portion 13 and the bottom 12 are preferably formed integrally and joined by an angularly extended portion 15 thus leaving the lower rear corners exposed to form axle mountings 16 and the mountings are each provided with an opening 17 for the reception of the axle 11.

A bearing slot 18 is formed in the upper portion of each side member 14 for the reception of a reel shaft 19 of preferably square cross sectional area. An operating handle 20 is attached to one end of the shaft 19.

The forward edge of the bottom 12 is bent upwardly and rearwardly to form a channel 21 for the reception of a rod 22 threaded at its outer ends for the reception of nuts 23 and an angularly disposed sheet of spring metal 24 is fastened to the inside of the bottom 12 by means of bolts 25 or the like.

The upper edge of the rear portion 13 is bent inwardly and downwardly to form a channel 26 to accommodate a rod 27 having threaded ends for the reception of nuts 28 and a pair of draw bars 29 having a handle bar 30 interposed between its upper ends and normally mounted upon the rod 27 and the axle 11, having suitable openings such as 31 for the reception of such rod and axle.

The end of the shaft 19 opposite to that end upon which the handle 20 is mounted is threaded as indicated at 32 for the reception of a nut 33. A pair of bushings 34 are mounted removably upon the shaft 19 and a plate 35 is permanently affixed adjacent one end of the shaft and a plate 36 removably mounted adjacent the other end of such shaft. A cotter pin 37 is mounted in a suitable opening in the shaft 19 and the plates 35 and 36 are each provided with inwardly directed pins 38.

In operation, when it is desired to use the truck for carrying, for example, barbed wire, the same is mounted upon the shaft 19, the pins 38 being forced into a barbed wire reel when the shaft 19 and its attendant parts are assembled therewith.

The thus assembled unit is placed in the bearing slots 18. The truck may then be readily moved from place to place while the wire automatically unreels therefrom. If it is desired to rewind the wire upon the reel, this may be done by means of the handle 20.

When it is desired to use the truck for other purposes, the shaft 19 and its attendant parts is removed from the bearing slots 18 and the draw bars 29 removed from the rod 27 and axle 11 and remounted upon the rod 27 and rod 22, as clearly indicated in Figure 9, thus providing a device which may be used as a reel carrier and as an ordinary hand truck for general purposes.

While but one form of the invention has been shown and described herein, it will be readily apparent to those skilled in the art that many minor modifications may be made herein without departing from the spirit of the invention or the scope of the appended claims.

What is claimed is:

1. A hand truck comprising a body composed of a pair of horizontally spaced side walls, a bottom wall connecting the lower portions of the side walls, a back wall connecting the adjacent edge portions of the side walls, the upper free corner portions of the side walls being removed to provide an inclined edge portion, said side walls being formed with inclined slots opening through said inclined edge portion and adapted to receive the end portions of a reel shaft, a handle structure projecting upwardly from the side walls, adjacent the back wall and an elongated strip spring secured at one end to the bottom wall and projecting upwardly in a position to frictionally engage a reel mounted between the side walls to act as a brake.

2. A hand truck comprising a body composed of a pair of horizontally spaced side walls, a bottom wall connecting the lower portions of the side walls, a back wall connecting the adjacent edge portions of the side walls, the upper free corner portions of the side walls being removed to provide an inclined edge portion, said side walls being formed with inclined slots opening through said inclined edge portion and adapted to receive the end portions of a reel shaft, a handle structure projecting upwardly from the side walls, adjacent the back wall and an elongated strip spring secured at one end to the bottom wall and projecting upwardly in a position to frictionally engage a reel mounted between the side walls to act as a brake, said back wall and bottom wall being connected by a short inclined wall, the lower rear corner portion of the side walls being formed with openings, an axle disposed through said openings and wheels at the end of the axle.

CHARLES W. WELKER.

REFERENCES CITED

The following references are of record in the file of this patent:

UNITED STATES PATENTS

| Number | Name | Date |
|---|---|---|
| 30,725 | Estes | Nov. 27, 1860 |
| 443,442 | Harper | Dec. 23, 1890 |
| 1,587,842 | Knox | June 8, 1926 |
| 1,789,343 | Rogers | Jan. 20, 1931 |
| 2,416,585 | Holub | Feb. 25, 1947 |

FOREIGN PATENTS

| Number | Country | Date |
|---|---|---|
| 17,278 | Great Britain | Aug. 29, 1901 |